United States Patent [19]
Fauck et al.

[11] 4,304,441
[45] Dec. 8, 1981

[54] VARIABLE LOAD VALVE DEVICE HAVING ADJUSTABLE BIAS MEANS TO WITHHOLD PROPORTIONAL BRAKE CONTROL DURING LOW LEVEL BRAKE REQUIREMENTS

[75] Inventors: Gerhard Fauck, Hanover; Karl-Heinz Deike, Pattensen; Heinz-Werner König, Barsinghausen, all of Fed. Rep. of Germany

[73] Assignee: Wabco Fahrzeugbremsen GmbH, Hanover, Fed. Rep. of Germany

[21] Appl. No.: 139,616

[22] Filed: Apr. 11, 1980

[30] Foreign Application Priority Data

May 4, 1979 [DE] Fed. Rep. of Germany ....... 2917936

[51] Int. Cl.³ .............................................. B60T 8/22
[52] U.S. Cl. .................................................. 303/22 A
[58] Field of Search ................ 303/22 A, 22 R, 23 A, 303/23 R

[56] References Cited

U.S. PATENT DOCUMENTS 2,940,796 6/1960 Ortmann et al. ................ 303/22 A

Primary Examiner—Duane A. Reger
Attorney, Agent, or Firm—G. J. Falce

[57] ABSTRACT

In a variable load valve device of the type employing a walking beam type lever arrangement via which the control and compensating pistons are interconnected to obtain proportional control of the brake pressure, there is provided an externally accessible screw adjustment for varying the tension of a bias spring acting on one of the levers, whereby the proportional brake control is withheld until a predetermined level of brake pressure is achieved corresponding to the spring bias.

9 Claims, 1 Drawing Figure

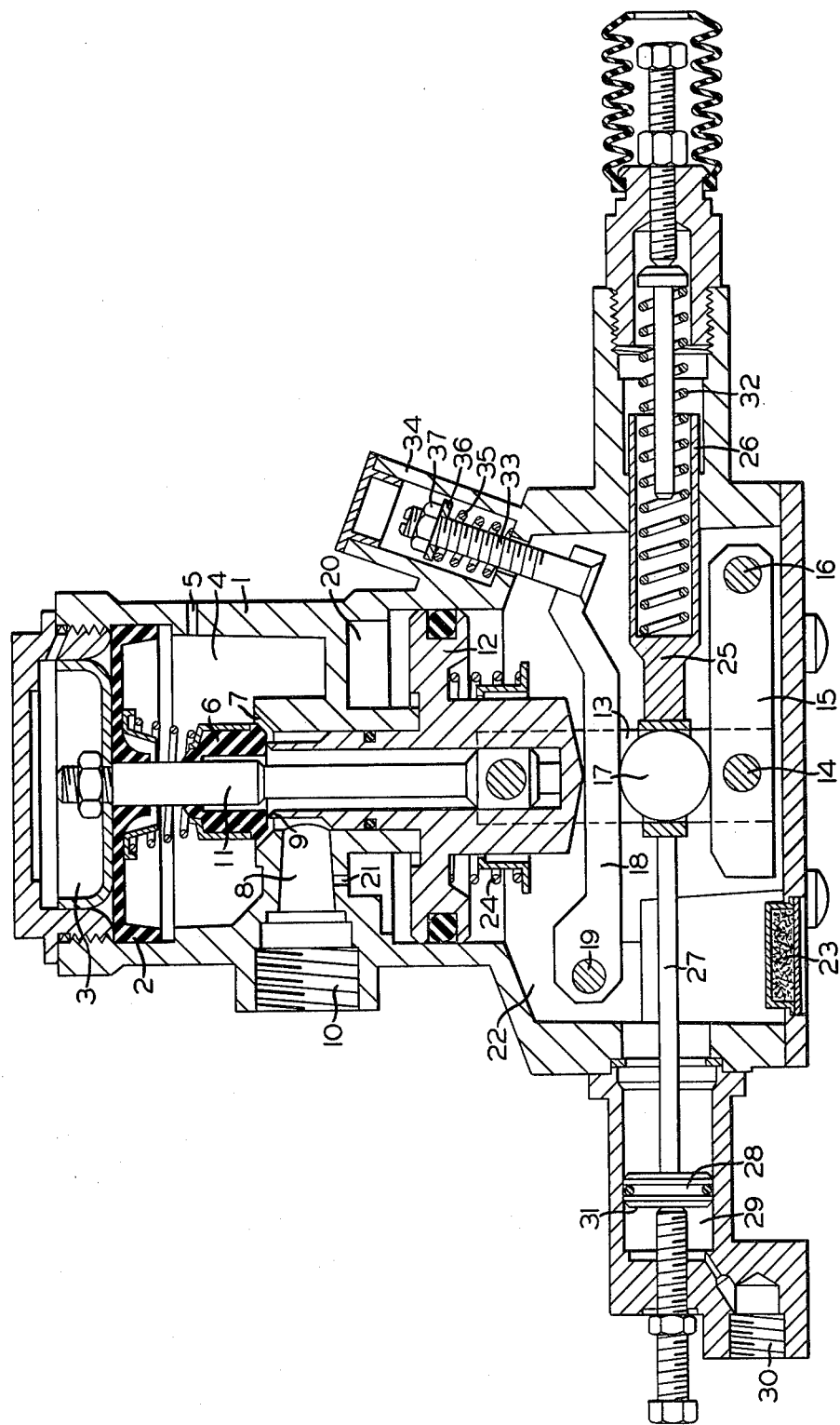

VARIABLE LOAD VALVE DEVICE HAVING ADJUSTABLE BIAS MEANS TO WITHHOLD PROPORTIONAL BRAKE CONTROL DURING LOW LEVEL BRAKE REQUIREMENTS

BACKGROUND OF THE INVENTION

The present invention is related to load responsive brake apparatus and more particularly to a variable load valve device of the type in which the load proportioning aspect is provided by a lever arrangement for interconnecting the pistons controlling the valving between the variable load valve inlet and outlet to obtain mechanical advantage in effecting closure of the valving when the brake pressure is at a level commensurate with the vehicle load.

Vehicles employing load dependent, brake force regulation on only one axle, for example the rear axle, are subject to wheel lock-up on the front axle under certain braking conditions. During brake requirements, a partially or fully loaded vehicle has its rear axle brake pressure modulated in accordance with the rear axle load, while full brake pressure is directed to the front axle. Due to the reduced rear axle brake force, the operator may find it necessary to increase the brake pressure to properly control the vehicle, thus causing the front axle wheels to lock up. In addition, brake shoe lining wear on the front axle wheels is accelerated.

In order to counteract these disadvantages, load dependent or variable load valves of the above type have been developed to withhold brake pressure regulation during the initial phase of a relatively heavy brake application, or throughout the brake process during a relatively light brake application. These developments rely upon preadjustment of components at the factory and thus have the disadvantage of not being able to be adjusted in the field for adaptation to different conditions of vehicle utilization except by disassembly of the device.

SUMMARY OF THE INVENTION

It is the object of the present invention, therefore, to provide a simple arrangement for adjusting a bias force on the components that control the variable load valve proportioning action without requiring disassembly of the device or replacement of parts.

In accomplishing this objective, a control piston and a compensating piston of the variable load valve device are coaxially arranged and interconnected by an arrangement of two oppositely pivotable levers separated by a movable fulcrum member. One of the levers is engageable with the compensating piston and the other lever is connected to the control piston. A normally seated valve element that is engageable with the compensating piston is unseated in response to actuation of the control piston by the supply of brake pressure to the control piston operating chamber. The unseated valve conducts brake pressure via the unseated valve element to the brake cylinders and to a pressure chamber containing the compensating piston. The force of this pressure acting on the compensating piston is amplified through the lever system to counteract the opposing force of the control piston. When the control piston force is counterbalanced, the compensating piston allows the valve element to be seated, terminating further buildup of brake pressure.

At the end of the one lever opposite its pivot end is a pin that projects through an opening in the casing and is formed with threads to receive an adjusting nut. A compression spring is caged between this adjusting nut and the casing to urge the one lever and accordingly the compensating piston, which bears against the one lever, in the opening direction of the valve element. Thus by varying the adjustment of this spring, the influence of the lever system in affecting the proportional control of brake pressure is withheld until a desired brake pressure level is obtained. In that this adjustment can be accomplished externally of the variable load valve device, no disassembly or parts replacement is necessary to adapt the degree of proportional load brake control to vehicles having different conditions of utilization.

BRIEF DESCRIPTION OF THE DRAWING

This and other objects and attendant advantages will be more readily apparent from the following description when taken with the accompanying single FIGURE drawing showing a sectional assembly view of the variable load valve comprising the invention.

DESCRIPTION AND OPERATION

In the variable load valve body 1, there is situated a control piston 2, the upper chamber 3 of which is connected with the atmosphere. Below the control piston 2, there is a chamber 4 that is connected via an inlet connection 5 to an operator's brake valve (not shown). A valve element 6 forms, in conjunction with a valve seat 7, an inlet valve 6, 7 opening into a chamber 8, and in conjunction with a valve seat 9, an outlet valve 6, 9 venting to the atmosphere. An outlet connection 10 leading to brake cylinders (not shown) also opens into chamber 8. Control piston 2 is connected to a piston rod 11 that passes through valve element 6 and projects into a compensating piston 12, that is coaxial with control piston 2.

At the lower end of piston rod 11, there is attached a fork member 13, to the lower end of which is hinged a lever 15 by means of a pin 14, which lever is also pivotable on a pin 16 fastened to the body 1. In conjunction with a fulcrum member 17 configured as a roller, and a lever 18 pivotable on a pin 19 fastened in the body 1, the lever 15 forms a mechanical amplification device for transmitting the forces arising on control piston 2 and compensating piston 12. Piston 12 is in contact at its lower end with the upper side of lever 18, whereas its upper end serves as the outlet-valve seat 9, which bear on valve element 6. An annular chamber 20 above compensating piston 12 is connected with chamber 8 via a bore 21. A chamber 22 below piston 12 is continuously connected with the atmosphere via an exhaust port and filter 23. A compression spring 24 connects piston 12 with piston rod 11 of control piston 2.

Fulcrum member 17 is supported in a mounting 25 with a guide extension 26. Connected to mounting 25 is a piston rod 27 of a piston 28, in a chamber 29 that is subject to a pressure medium provided by a load-dependent pressure from the pneumatic-cushion bellows (not shown) and introduced via the connection 30.

The slide extension 26 projects movably into a bore in the body. Carried in a recess of the slide extension 26, between the mounting 25 and an adjustable stop, there is situated a pretensioned adjustment spring 32.

The operation of the automatic load-dependent brakingforce regulator is as follows:

The compressed air directed into chamber 4 by the brake valve during a brake application passes into chamber 8 via the open inlet valve 6, 7 and then into the brake cylinder via outlet connection 10. Simultaneously, this pressure in chamber 4 lifts the piston 2, which in turn transmits its movement to fulcrum member 17 and lever 18 via piston rod 11, with the fork 13 attached to it and the lever 15 hinged to it by means of the pin 14. In addition, the compressed air passes via bore 21 into annular chamber 20 above piston 12 and forces the latter against the lever 18.

The force of piston 12 sufficient to overcome the opposing force of the lever 15 controlled by the piston 2 now depends on the position of the support 17, which is determined by the movement of control piston 28 controlled by the air-cushion pressures via the connection 30. As soon as this occurs, piston 12 moves downward, allowing valve element 6 to close the inlet valve 6, 7.

On partial release of the braking, control chamber 4 is partially vented. This disturbs the force equilibrium on piston 12. The pressure in chamber 20 prevails and moves piston 12 downward, thereby disengaging valve element 6 to open outlet valve 6, 9 until a new state of equilibrium is reached. On further decrease in pressure in chamber 4, the release of brake pressure is effected in the same manner until the pressure in both chambers 4 and 20 is depleted. A relief valve (not shown) may be employed to assure that no residual pressure remains in outlet connection 10, when the pressure at inlet connection 5 has been depleted.

If there is no longer any brake pressure present, then the piston 2 is released. Its force working against the downward pressure of piston 12 is lost, whence the piston 12 is moved downward further by the pressure still present in chamber 20. By this action, the outlet valve 6, 9 opens and the brake cylinders are vented through a bore in piston 12 and via a vent 23. Since the chamber 20 also becomes free of pressure, the spring-loaded piston 12 again moves upward, lifting the valve element 6, thus opening inlet valve 6, 7, to restore the variable load valve device to its original release position.

In accordance with the invention, there is attached to the one lever 18 a pin 33 that projects through an opening 34 in body 1. The projecting end of pin 33 is threaded to receive a nut 37. A spring 35 encircles pin 33 and rests between the body 1 and a washer 36 that bears against nut 37. By adjusting nut 37, the effective length of spring 35 and thus its compressive force may be varied to provide a desired bias on piston 12 in the opening direction of valve element 6. By reason of this bias force, a predetermined brake pressure must be established, as reflected in chamber 20, before the force on piston 12 is effective through the lever system. Consequently, load-dependent proportioning of brake pressure is withheld until a predetermined brake pressure is developed. This predetermined brake pressure corresponds to the bias force provided by spring 35 acting on piston 12 via lever 18, and may be adjusted, as desired, from an easily accessible location that is external of the valve body.

Having thus described the invention, what we claim as new and desire to secure by Letters Patent, is:

1. For a vehicle having load-dependent fluid pressure cushion means supporting the vehicle, there is provided a variable load valve device for automatically developing brake pressure in accordance with the vehicle load condition comprising:
   (a) an inlet and an outlet via which the vehicle brake pressure is transmitted;
   (b) a control chamber to which said inlet is connected;
   (c) a delivery chamber to which said outlet is connected, said control and delivery chambers being interconnected to provide the fluid pressure transmission between said inlet and outlet;
   (d) a first piston subject to said control chamber fluid pressure for movement in one direction;
   (e) a second piston subject to said delivery chamber fluid pressure for movement in a direction opposite said one direction;
   (f) means for interconnecting said first and second pistons to provide mechanical advantage therebetween;
   (g) valve means operative responsive to movement of said first and second pistons in said one direction to establish fluid pressure communication between said control and delivery chambers, and operative responsive to movement of said first and second pistons in said opposite direction to interrupt fluid pressure communication between said control and delivery chambers;
   (h) load responsive means subject to the fluid pressure of said cushion means for varying the mechanical advantage of said interconnecting means; wherein the improvement comprises:
   (i) means acting on said interconnecting means for biasing one of said first and second pistons in said one direction.

2. A variable load valve device as recited in claim 1, wherein said interconnecting means comprises:
   (a) a pair of spaced-apart levers, each said lever having a hinged connection with the casing of said variable load valve device;
   (b) a fulcrum member disposed in the space between said levers for engagement therewith;
   (c) said second piston being engageable with one of said levers on a side thereof opposite said fulcrum members; and
   (d) said first piston having a stem portion pivotally connected to the other one of said levers.

3. A variable load valve device as recited in claim 2, further characterized in that the hinged connections of said levers lie on opposite sides of said fulcrum member.

4. A variable load valve device as recited in claim 3, further characterized in that said fulcrum member is displaceable along the length of said levers to vary said mechanical advantage of said interconnecting means.

5. A variable load valve device as recited in claim 4, further characterized in that said fulcrum member is connected to said load responsive means to vary the position of said fulcrum member along said levers in accordance with said vehicle load condition.

6. A variable load valve device as recited in claim 2, wherein said bias means comprises a spring that exerts a predetermined bias force on said second piston.

7. A variable load valve device as recited in claim 6, further characterized in that said predetermined bias force is exerted in said one direction.

8. A variable load valve device as recited in claim 6, further characterized in that said spring acts on said one lever to exert said predetermined bias force on said second piston.

9. A variable load valve device as recited in claim 8, wherein said one lever includes a pin having a screw threaded end portion projecting through an opening in the casing of said variable load valve device to receive an adjusting nut thereon, said spring being caged between the casing and said adjusting nut to provide for adjustment of said predetermined bias force.

* * * * *